(12) United States Patent
Algoet et al.

(10) Patent No.: US 11,904,343 B2
(45) Date of Patent: Feb. 20, 2024

(54) DEVICE FOR INJECTING A CRYOGENIC FLUID THROUGH THE BASE OF A MIXER

(71) Applicants: Air Liquide France Industrie, Paris (FR); L'Air Liquide, Societe Anonyme pour l'Etude et l'Exploitation des Procedes Georges Claude, Paris (FR)

(72) Inventors: Jo Algoet, Wijtschate Heuvelland (BE); Alain Brangeon, Guidel (FR); Michel Pichou, Paris (FR); Christian Reymond, Montmorency (FR)

(73) Assignees: L'Air Liquide, Societe Anonyme Pour L'Etude Et L'Exploitation Des Procedes Georges Claude, Paris (FR); Air Liquide France Industrie, Paris (FR)

( * ) Notice: Subject to any disclaimer, the term of this patent is extended or adjusted under 35 U.S.C. 154(b) by 930 days.

(21) Appl. No.: 16/496,551

(22) PCT Filed: Nov. 30, 2017

(86) PCT No.: PCT/FR2017/053293
§ 371 (c)(1),
(2) Date: Sep. 23, 2019

(87) PCT Pub. No.: WO2018/172627
PCT Pub. Date: Sep. 27, 2018

(65) Prior Publication Data
US 2020/0376508 A1  Dec. 3, 2020

(30) Foreign Application Priority Data
Mar. 23, 2017 (FR) .................................... 1752391

(51) Int. Cl.
*B05B 9/00* (2006.01)
*B05B 15/65* (2018.01)
(Continued)

(52) U.S. Cl.
CPC .............. *B05B 9/005* (2013.01); *B01F 35/91* (2022.01); *B05B 1/304* (2013.01); *B05B 1/323* (2013.01);
(Continued)

(58) Field of Classification Search
CPC ......... B05B 9/005; B05B 15/65; B05B 1/304; B05B 1/323; B01F 35/91; B01F 2101/06;
(Continued)

(56) References Cited

U.S. PATENT DOCUMENTS 4,496,309 A * 1/1985 Schachter ............... F23Q 2/163
239/533.1
4,576,338 A * 3/1986 Klomp ................... F02M 61/18
239/533.13
(Continued)

FOREIGN PATENT DOCUMENTS

EP  2 309 160  4/2011
FR  2 903 482  1/2008
(Continued)

OTHER PUBLICATIONS

International Search Report and Written Report for PCT/FR2017/053293, dated Feb. 27, 2018.
(Continued)

*Primary Examiner* — Christopher S Kim
(74) *Attorney, Agent, or Firm* — Yan Jiang

(57) ABSTRACT

The invention relates to a device for injecting a fluid, in particular a cryogenic fluid, the device comprising a fluid feed head and a fluid dispenser body, detachably mounted on said feed head, said feed head comprising a groove for circulating the fluid fed to said body, said groove being closed when the body is mounted on the feed head and said groove being open when the feed head and the body are detached from one another.

19 Claims, 5 Drawing Sheets

(51) Int. Cl.
　　*B05B 1/30*　　　(2006.01)
　　*B05B 1/32*　　　(2006.01)
　　*F25B 19/00*　　(2006.01)
　　*B01F 35/91*　　(2022.01)
　　*A21C 1/14*　　　(2006.01)
　　*B01F 35/90*　　(2022.01)
　　*B01F 101/06*　　(2022.01)

(52) U.S. Cl.
　　CPC ............ *B05B 15/65* (2018.02); *F25B 19/005* (2013.01); *A21C 1/1495* (2013.01); *B01F 2035/98* (2022.01); *B01F 2101/06* (2022.01)

(58) Field of Classification Search
　　CPC ... B01F 2035/98; F25B 19/005; A21C 1/1495
　　USPC ............ 239/452, 453, 456, 459, 460, 533.1
　　See application file for complete search history.

(56) References Cited

U.S. PATENT DOCUMENTS

| | | |
|---|---|---|
| 4,824,024 A | 4/1989 | Bishop et al. |
| 5,131,429 A | 7/1992 | Nixon |
| 7,464,885 B1 * | 12/2008 | Chang .................. B05B 1/3436 239/533.1 |
| 2006/0180682 A1 | 8/2006 | Burato et al. |
| 2007/0102841 A1 | 5/2007 | Bondeson et al. |
| 2008/0230634 A1 | 9/2008 | Ziegler |
| 2009/0314010 A1 | 12/2009 | Flamant et al. |
| 2017/0119213 A1 | 5/2017 | Newman et al. |
| 2017/0231432 A1 | 8/2017 | Newman et al. |
| 2020/0376508 A1 | 12/2020 | Algoet et al. |

FOREIGN PATENT DOCUMENTS

| | | |
|---|---|---|
| FR | 2 939 056 | 6/2010 |
| WO | WO 2008/007000 | 1/2008 |
| WO | WO 2015/075255 | 5/2015 |

OTHER PUBLICATIONS

Leaflet from DeMaCo, "Johnston Bayonet Coupling," published Sep. 2010, 1 page.

* cited by examiner

US 11,904,343 B2

DEVICE FOR INJECTING A CRYOGENIC FLUID THROUGH THE BASE OF A MIXER

CROSS-REFERENCE TO RELATED APPLICATIONS

This application is a § 371 of International PCT Application PCT/FR2017/053293, filed Nov. 30, 2017, which claims § 119(a) foreign priority to French patent application FR 1752391, filed Mar. 23, 2017.

BACKGROUND

Field of the Invention

The present invention relates to a device for injecting a fluid, in particular a device intended to inject, into a chamber, a cryogenic fluid under a pressure greater than the pressure prevailing in the chamber. Reference may be made in the following text to "injection device" or "injection nozzle".

Related Art

It is known practice to cool the contents of a blender or of a kneader by introducing liquid CO2 or liquid nitrogen (LN2) into the base of the vessel of the blender or kneader. The fluid, introduced under pressure via an injection nozzle, transforms, as soon as it expands, in the nozzle, into a solid, and into cold gas. The solid or the liquid mixes with the contents of the blender and cools it, while the cold gas likewise contributes toward cooling as it passes through the entire mass contained in the vessel.

A known solution for implementing this method comprises several injection devices that are disposed in the bottom of the vessel and fed with fluid by a set of lines.

Such cryogenic fluid injection devices are described in the document WO 2008/00700. They comprise a fluid feed head and a fluid dispensing body, through which fluid flow passages that communicate with one another pass.

In these types of installation, the injection devices tend to be soiled by different contaminants, not just at the external surfaces but also in certain parts of the fluid flow passages. Therefore, they have to be able to be disassembled for cleaning purposes, which is mandatory in the case of food products and may be made necessary by abnormal operation or by accidental contamination. The injection devices described in the document WO 2008/00700 have the drawback of being difficult to clean, in particular at their feed head.

SUMMARY OF THE INVENTION

The present invention aims to solve the above problems and, to this end, proposes a device for injecting a fluid, in particular a cryogenic fluid, the device comprising a fluid feed head and a fluid dispensing body mounted in a detachable manner on said feed head, said feed head comprising a fluid flow groove, feeding said body, said groove being closed in the mounted position of the body on the feed head and said groove being open in the separated position of the feed head and the body.

By virtue of the open configuration of said groove, a fluid flow passage that is easy to access following separation of the body and the head is provided. Said dispensing head can thus be maintained in a state of optimal cleanliness without requiring cleaning operations that are complex and ultimately not very reliable, as was the case with the prior art devices.

Preferably, said device comprises a delivery valve, which alternately opens and closes the injection of the fluid.

According to different additional features of the invention, which may be taken together or separately:
said body has one or more fluid flow channels that together define a flow cross section for the fluid in the body,
said groove having a flow cross section for the fluid that is greater than the flow cross section for the fluid in the body,
said groove has a substantially constant depth,
said groove has a U-shaped cross section,
said groove is annular,
a first part of said groove has a reduced depth and a second part has a greater depth, forming a cavity,
said first part of the groove and said second part of the groove are complementary and form all of the groove,
said second part of the groove has an angular extent of between 30° and 90°,
said duct opens out at a side wall of the groove, notably at said cavity,
said feed head comprises a fluid flow duct,
said duct opens out at a bottom wall of the groove,
said head has a face at which said groove opens out in the separated position of the feed head and the body,
said head extends in a longitudinal direction orthogonal to said face,
said groove has a depth greater than three quarters of an extension of said feed head in said longitudinal direction,
said device comprises a seal closing said groove,
said seal is sandwiched between said head and said body,
said seal has orifices that open into said channels of the body,
said fluid flow channels form a bundle,
said bundle of channels and said groove are disposed coaxially,
said channels are regularly distributed angularly,
there are at least three of said channels,
said head has a well for the movement of the delivery valve, said well and said groove being positioned concentrically.

According to another aspect of the invention, said delivery valve is forced against said body by a spring, said device comprising a stop, mounted on a stem of the delivery valve, said spring bearing against said stop, said spring comprising a plurality of turns and said stop and said spring being configured such that the stop comes into contact with the body before the turns of the spring are brought into contact with one another during actuation of the delivery valve.

According to this aspect of the invention, which will be advantageous whether or not the dispensing head is provided with a groove, good repeatability of the travel of the delivery valve is ensured. In this way, a device for injecting a fluid that allows better control of the fluid flow rate is provided.

According to additional features of this aspect of the invention, which may be taken together or separately:
said stop comprises a first part, intended to be standard, and a second part, intended to be specific to each application,
said stem comprises a portion of reduced diameter and said stop comprises a mounting ring, said stem and said mounting ring being mutually configured so as to allow said ring to be snap-fastened on said stem at said portion of reduced diameter in order to axially position said first and/or second parts of the stop along said stem, said mounting ring has a symmetric configuration so as to be able to be mounted either way round on the stem of the delivery valve.

According to another aspect of the invention, said device also comprises means for centering the spring so as to keep said spring radially at a distance from the delivery valve.

According to this aspect of the invention, which will be advantageous independently of or in combination with the previous aspects thereof, a phenomenon of abrasion of the spring and of the delivery valve, in particular of the stem of the delivery valve, is avoided, this phenomenon otherwise possibly arising, in the absence of guidance, in the case of repeated rubbing of the delivery valve, in particular its stem, against the spring, in particular against the internal part of the turns thereof.

According to additional features of this aspect of the invention, which may be taken together or separately:

said centering means comprise a centering finger for centering a first end of the spring, said centering finger being mounted on said delivery valve, said centering finger is mounted on the stem of the delivery valve, said centering finger and said stop, in particular the part specific to each application of said stop, form a single part, said centering means comprise a guide tube for guiding a second end of the spring, said guide tube being formed in said body.

According to another aspect of the invention, said device comprises an assembly clamp for assembling the body and the dispensing head, said device being configured to convert a transverse, notably radial, clamping movement of said clamp, with respect to a longitudinal axis of extension of said device, into a movement clamping the head and the body together along said longitudinal axis of extension.

According to this aspect of the invention, which will be advantageous independently of or in combination with the previous aspects, the leaktightness of the device is enhanced.

According to additional features of this aspect of the invention, which may be taken together or separately:

said clamp and said head and/or said body have an inclined surface with respect to said longitudinal axis, said inclined surfaces being intended to cooperate with one another during the clamping of the clamp, said device comprises a peripheral seal between said feed head and said body.

The invention also relates to the use of an injection device as described above for cooling loose product.

It also relates to a method for cooling loose material contained in a chamber, according to which a cryogenic fluid is injected into the middle of the material to be cooled with the aid of at least one injection device as described above, preferably m injection devices as described above, which are distributed symmetrically in the bottom part of the chamber, m being an integer between 2 and 20, preferably an even number.

Advantageously, the chamber is a blender. The method is particularly well suited to the cooling of any type of material, whatever its physical state, notably for products that are liquid, pasty, solid or pulverulent.

BRIEF DESCRIPTION OF THE FIGURES

The invention will now be described in more detail with the aid of practical examples, illustrated in the drawings, in which.

DETAILED DESCRIPTION OF THE INVENTION

Figure 1:
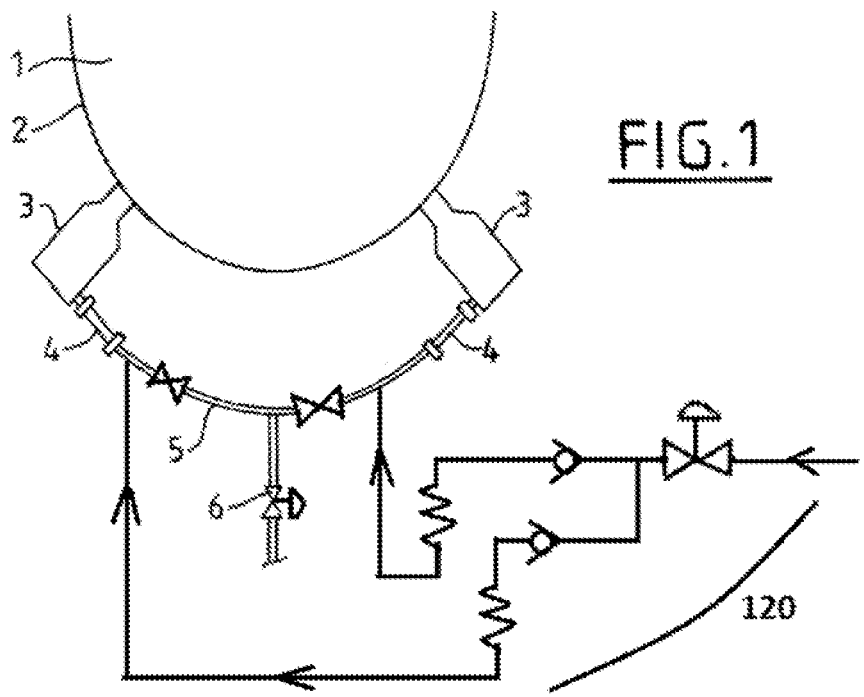
FIG. 1 is a schematic view in section of an installation comprising a chamber and injection devices according to the invention.
Figure 2:
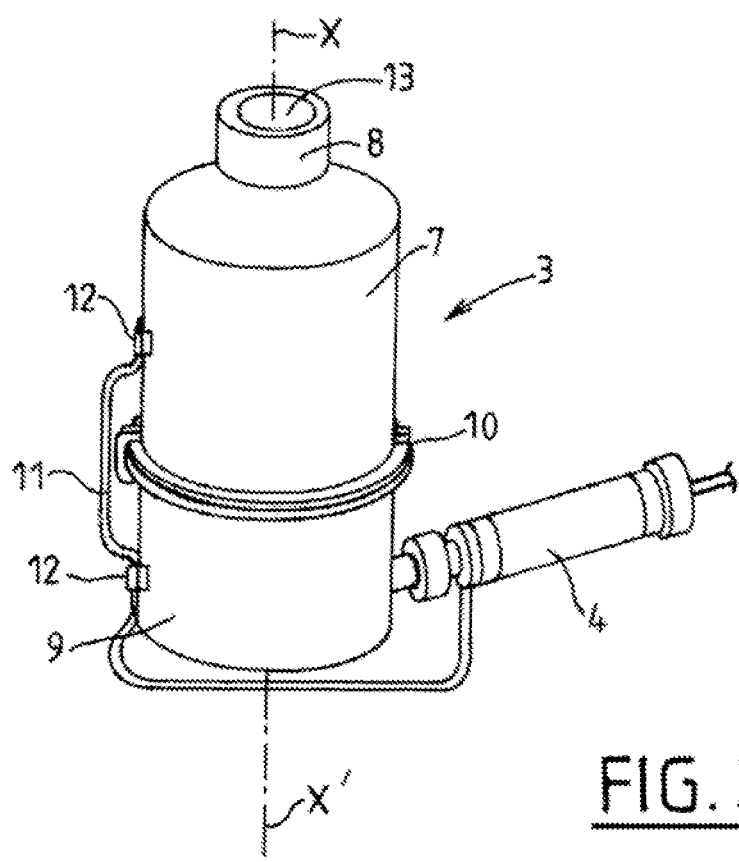
FIG. 2 is a view in elevation of a device according to the invention.
Figure 3:
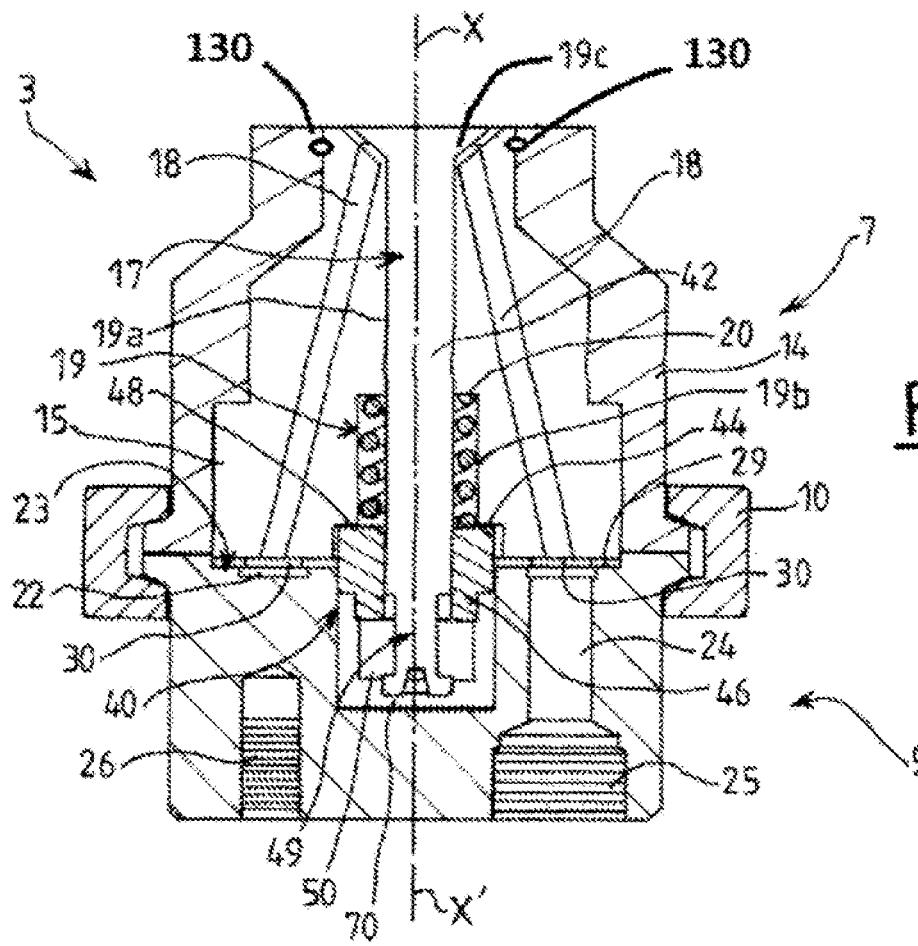
FIG. 3 is a view in longitudinal section of the device in FIG. 2.

As illustrated in FIGS. 1 to 3, the invention relates to a device 3 for injecting a fluid, in particular a cryogenic fluid. It is in particular an injection device intended to be fastened to the lower part of a container containing a product to be cooled in a loose form.

The device according to the invention is suitable for cooling product equally in a liquid, pasty, solid or granular form. A "pasty product" means any product of which the viscosity is between liquid and solid.

The cryogenic fluid used is liquid nitrogen or liquid $CO_2$, in particular when the product to be cooled is a food product. However, the device according to the invention may be employed with any type of cryogenic fluid.

As an example of the use of the device according to the invention, FIG. 1 shows the lower part of a container formed of a chamber 1, in particular a blending vessel, to the wall of which two devices 3 for injecting cryogenic fluid according to the invention are fastened, preferably by welding. The devices 3 are connected by a flexible hose 4 and an insulated pipe 5 to a solenoid valve 6 for opening and closing the feed of cryogenic fluid. According to one advantageous embodiment, the device according to the invention is fastened to the lower part of the blending vessel.

As will be described in more detail below in the present description, FIG. 1 shows the presence, in an advantageous implementation of the invention of an installation 120 for feeding the nozzles 3 with compressed air:

a solenoid valve feeding gas to two lines, one line for each nozzle 3;

each line is provided with a nonreturn valve followed by a "pigtail" type system, the presence of the nonreturn valve being advantageous for ensuring that cryogen (nitrogen or $CO_2$) could not pass into the circuit for compressed air, while the presence of the "pigtails" is advantageous for ensuring that the upstream component (the nonreturn valve) is brought into contact only with gas and not with liquid.

The advantage of this flushing with compressed air will be described further below (although other flushing gases could, of course, be envisioned, compressed air being inexpensive).

FIG. 2 shows in more detail an injection device 3 according to the invention. It comprises, in an upper part, a fluid dispensing body 7 and, in a bottom part, a feed head 9. The body 7 and the head 9 are mounted in a detachable manner on one another, notably by way of assembly clips 10. A connection of the screwed type or the like could also be used.

Said device has, for example, an axisymmetric configuration about a longitudinal axis X-X', which is vertical here. Said feed head 9 and said body 7 extend for their part along said longitudinal axis X-X' in the continuation of one another. A free end 8 of said body 7 forming a neck is intended to be fastened to the external wall of the chamber 1.

Fastened to the head 9 of said device 3 is the flexible hose 4. A whip check cable 11 in this case connects the flexible hose 4, the head 9 and/or the body 7. This cable is fastened with the aid of safety hooks 12 such that only qualified persons can undo it for example for disassembly purposes.

Thus, according to one advantageous embodiment, the device is connected to the cryogenic fluid feed via the fluidic flexible duct 4. This allows rapid disassembly. Specifically, the flexible duct 4 does not have to be removed for cleaning.

According to a preferred embodiment, cleaning is further facilitated by the flexible duct 4 being retained on the device 3 by a rapid mechanical retention system of the quick connector type in order to also allow the removal of the flexible duct 4 if this ultimately proves necessary.

As illustrated in FIG. 3, said body 7 is advantageously hollow and a delivery valve 17, forced by a spring 19, is inserted into said body 7. Said body 7 also comprises one or more channels 18, two of which are visible in FIG. 3. Said channels 18 are substantially parallel to said delivery valve and are intended to be fed with pressurized cryogenic fluid, an upstream end of said channels 18 being connected to said cryogenic-fluid feed head 9 and a downstream end opening out at a seat of the delivery valve 17.

The spring 19 comprises a plurality of turns. It is preloaded such that the delivery valve cannot slide without being subjected to a pressure of the cryogenic fluid at least equal to a threshold pressure.

Thus, as soon as the pressure of cryogenic fluid is less than a given threshold, the pressure necessary for sliding the delivery valve 17 will no longer be achieved and the delivery valve 17 will reposition itself tightly against its seat.

The choice of the spring and the preloading thereof depend on the cryogenic fluid that is used. Thus, for nitrogen, it should be able to be preloaded typically between 0 and 7 bar, and for CO2 up to 25 bar.

According to an advantageous embodiment, the device comprises n through-channels 18, n between 1 and 20, the number thereof increasing when the use pressure of the cryogenic fluid decreases. Preferably, said channels 18 form a bundle oriented coaxially with the delivery valve 17, along the longitudinal axis X-X', said channels being regularly distributed angularly around said axis. In particular, there are at least three of said channels. Here, there are six of them. Such a configuration is particularly suitable for nitrogen applications. That being said, as mentioned above, the invention is not limited to such applications and can also be used for CO2. In such a case, the number of channels 18 is advantageously two, positioned at 180° with respect to one another.

The body 7 is formed, for example, of two elements, a hollow external part 14, a lower end of which bears indirectly on the head 9, and the other end of which is intended to be fastened to the wall of the chamber. Disposed inside this external part 14 is an internal part 15 of complementary shape, likewise hollow, having at its center a through-opening accommodating the delivery valve 17. Said internal part 15 is also passed through by the channels 18.

The central through-opening in the internal part 15 comprises three zones, a central zone 19a with a diameter substantially the same as that of the delivery valve such that the delivery valve can be slid in this zone, and a lower zone 19b with a larger diameter, such that it can receive, around the axis of the delivery valve, the spring 19 forcing the latter. The spring 19 is held by a first shoulder 20 formed between the zones 19a and 19b. At the opposite, upper end, the zone 19c has a beveled shape, with a larger diameter at its free end, the beveled shape being designed to define the seat of the delivery valve 17, when the delivery valve 17 is forced by the spring. Such a configuration is also visible in the embodiment in FIG. 8.

In FIG. 3, it is possible to see that there is an O-ring 130, the presence of which is very advantageous for prevent any ingress of food product, and very particularly juice or liquid, into the nozzle, when the latter is stopped, and notably between the base and the body of the nozzle, that is to say between the external part 14 and the internal part 15, which is provided with the channels 18 etc.

As is more clearly visible in FIGS. 4 to 7 and according to the invention, said feed head 9 comprises a groove 22 for the flow of fluid feeding said body 7, more particularly all of said channels 18 of said body 7, the upstream end of which opens into said groove 22.

Figure 4:
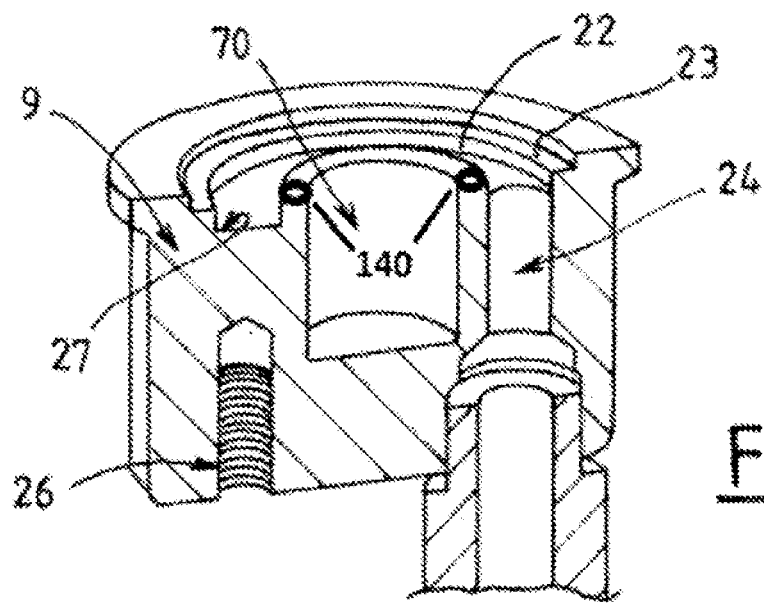
FIG. 4 is a perspective view of a part of the device in FIG. 2, in section on the same section plane as that in FIG. 3, FIG. 5 repeats FIG. 4 according to a first embodiment variant and in a slightly different orientation.
Figure 5:
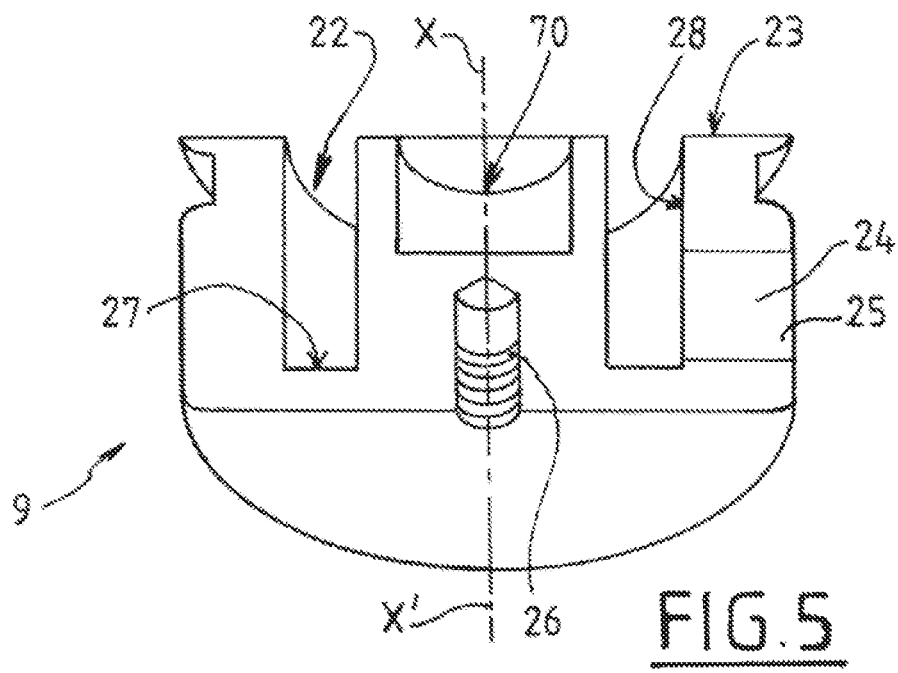

Referring again to FIG. 3, it is apparent that said groove is closed in the mounted position of the body 7 on the feed head 9. By contrast, said groove 22 is open in the separated position of the feed head 9 and the body 7, such a configuration corresponding to what is illustrated in FIGS. 4 and 5.

First of all, it is clear that such a groove makes it possible to establish communication with several channels 18 of the body 7 without there only being two of these channels, and even more particular without these channels being diametrically opposite. In addition, following removal, the feed head is particularly easy to clean since an essential part thereof, namely the part formed by the groove 22, is directly accessible, notably from the open upper part of the groove.

Said feed head 9 is advantageously in one piece, that is to say made of a single part, said groove 22 being obtained for example by machining said feed head 9. This provides a solution that is very easy to implement. Specifically, without it being necessary to remove a feed head 9 that would have been made up of several parts, it is possible to clean the groove 22 through the open upper part thereof.

Said feed head 9 has in this case a face 23 at which said groove 22 opens out in the separated position of the feed head 9 and the body 7, said face 23 being oriented orthogonally to the longitudinal axis of extension X-X'.

Said groove 22 is for example annular and extends angularly around the longitudinal axis X-X'. It is coaxial with the delivery valve 17.

According to the embodiment in FIGS. 3 to 5, said groove advantageously has a depth, that is to say a dimension along the longitudinal axis X-X', that is substantially constant. In this case, it has a U-shaped cross section.

Said feed head 9 comprises a fluid flow duct 24 intended to dispense the fluid into said groove 22. Said duct 24 has, at its opposite end from the one that opens into the groove 22, an internal thread 25 that allows the abovementioned quick connector to be fastened. Said feed 9 also comprises a bore 26 here, which is optionally tapped.

In the embodiment in FIGS. 3 and 4, said duct 24 opens out at a bottom wall 27 of the groove 22. In this embodiment, said groove has a shallow depth, namely a depth less than one quarter of an extension of said feed head in said longitudinal direction X-X'.

As illustrated in FIG. 5, in another embodiment, said groove 22 has a flow cross section for the fluid that is greater than the flow cross section for the fluid in the body, that is to say than the cumulative cross section of the channels 18 of the body 7. This avoids an effect of fluid expansion upstream of the outlet orifices of the channels 18.

Said groove has in this case a depth greater than three quarters of the extension of said feed head 9 in said longitudinal direction X-X'. In this embodiment, said duct 24 opens out at a side wall 28 of the groove 22.

And FIG. 4 (and only FIG. 4 for clarity reasons) shows the advantageous presence of a seal 140, situated on the step facing the step 23 on the other side of the slot or groove, this presence being very particularly advantageous for limiting the risks of dust ingress at the groove 22.

Figure 6:
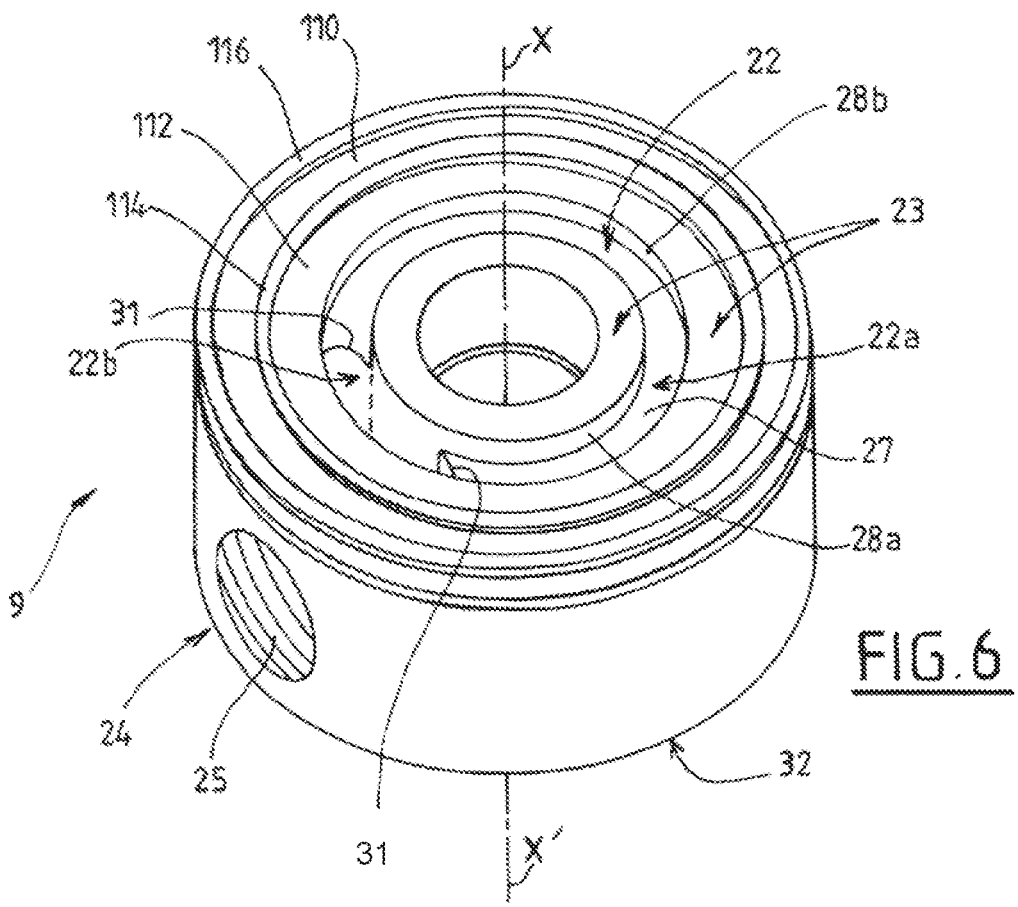
FIG. 6 is a perspective view of a second embodiment variant, according to the invention, of the part of the device illustrated in FIGS. 4 and 5.
Figure 7:
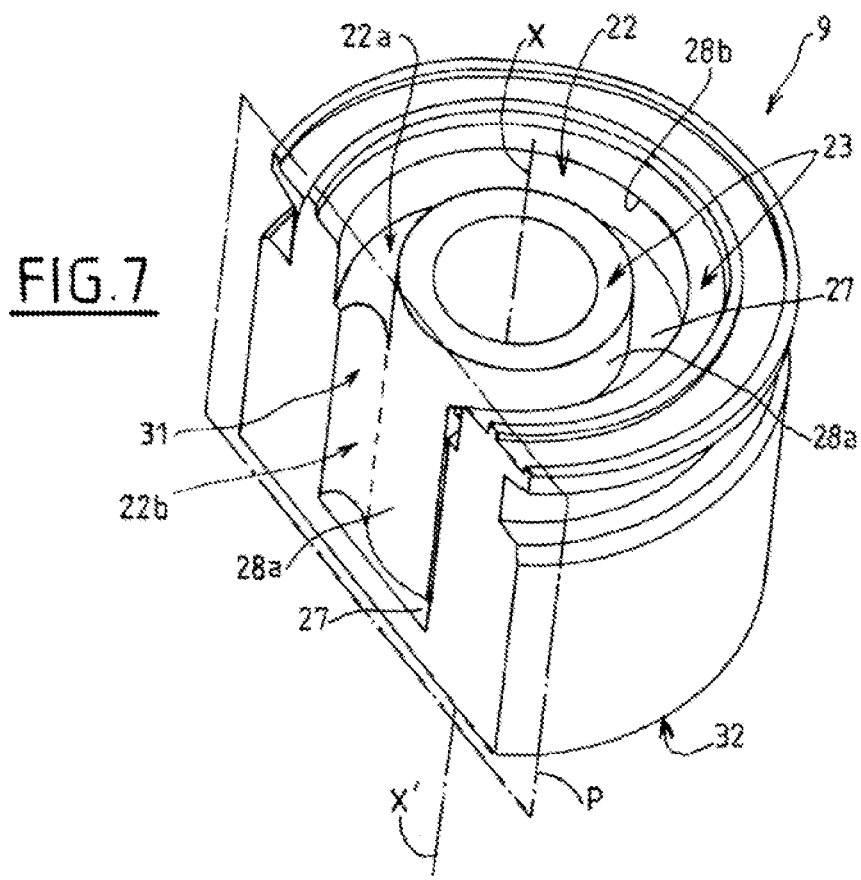
FIG. 7 is a perspective view of the part of the device illustrated in FIG. 6, in a section plane revealing a detail of said device.

As illustrated in FIGS. 6 and 7, according to another embodiment, a first part 22a of said groove 22 has a reduced depth and a second part has a greater depth, forming a cavity 22b. In other words, the bottom 27 of the groove is situated at two different levels. The bottom 27 of the groove is situated relatively close to the surface 23 at which said groove 22 leads into the part 22a where the groove has a shallower depth and relatively close to a base surface 32 of said feed head 9, at the level of said cavity 22b, said base surface 32 being opposite to said surface 23 along the longitudinal axis XX' of the device. The depth of the first part 22a of the groove is, for example, two to ten times less than the depth of the cavity 22b, said depth being measured each time from said surface 23 at which said groove 22 opens out down to the respective part of the bottom 27.

The cavity 22b is more clearly visible in FIG. 7, in which it is cut by the section plane P. Said cavity has a cross section substantially in the shape of an angular portion of a ring. Here, in each of its first and second parts 22a, 22b, the bottom 27 of the groove 22 is flat. The edges 31 of the angular end of the cavity 22b are, for example, rounded. In a variant, they could be oriented radially.

Said first part 22a of the groove and said second part 22b of the groove are complementary and form all of the groove 22. Each of the first part 22a of the groove 22 and the cavity 22b has an internal side wall 28a in continuation of one another, forming a cylinder, with a largest axial dimension at the level of the cavity 22b. Similarly, each of the first part 22a of the groove 22 and the cavity 22b has an external side wall 28b in continuation of one another, forming a cylinder, with a largest axial dimension at the level of the cavity 22b, this part of largest dimension being hidden in the figures. Said second part 22b of the groove 22 has an angular extent of, notably, between 30° and 90°.

According to this embodiment, said duct 24 (visible in FIG. 6) opens out at the external side wall of the groove 22, in particular at the level of said cavity 22b, in this case substantially at the middle thereof, along the angular extent of said cavity 22b. Said duct 24 is, for example, oriented radially.

According to another variant, which is not illustrated, said groove 22 has a shallow depth, as in the embodiment in FIGS. 3 and 4, and said duct 24 is oriented radially, as in the embodiment in FIG. 5. However, unlike in the embodiment in FIG. 5, said duct 24 comprises an extension extending radially under the groove 22, without crossing the latter since it has a shallow depth, and under the cavity 60, the bore 26 having been omitted in order to allow said extension to pass through. In order to establish a fluidic connection between said groove 22 and the extension of the duct 24, two bores, which are oriented parallel to the longitudinal axis XX', are provided in said feed head 9 from the bottom of said groove 22 to said extension. They are situated symmetrically with respect to said longitudinal axis XX'.

Referring again to FIG. 3, it can be seen that, preferably, said device comprises a seal 29 closing said groove 22 by bearing against the surface 23, said surface 23 forming a peripheral shoulder joined to an upper edge of the feed head 9. Said seal 29 is sandwiched between said head 9 and said body 7. Said seal 29 has orifices 30, each of the orifices 30 being situated facing one of the channels 18 of the body 7. In this way, said orifices 30 allow the fluid to pass from said groove 22 to said channels 18 of the body 7 while ensuring leaktightness between said feed head 9 and said body 7. A seal of the same type is used in the embodiments in FIGS. 5 to 7.

According to another aspect of the invention, said device comprises a stop 40, mounted on a stem 42 of the delivery valve, said spring 19 bearing against said stop 40.

Said stop 40 and said spring 19 are configured such that the stop 40 comes into contact with a second shoulder 44 of the body 7 before the turns of the spring 19 are brought into contact with one another during actuation of the delivery valve 17. This improves control of the travel of the delivery valve 17, which no longer depends on the spring itself and any manufacturing spread thereof. In this way, the flow rate of fluid dispensed in the chamber is controlled optimally.

Said stop 40 preferably comprises a first part 46, intended to be standard, and a second part 48, intended to be specific to each application. In particular, the thickness of the first part 46, that is to say the dimension of the first part 46 along the axis X-X', is constant from one device to another, while the thickness of the second part 48 may be adapted from one application to another so as to take, in particular, variations in pressure inside the chamber into account.

Here, the stem 42 comprises a portion 49 of reduced diameter and said stop comprises a mounting ring 50. Said stem 42 and said mounting ring 50 are mutually configured so as to allow said ring 50 to be snap-fastened on said stem 42 at said portion of reduced diameter 49 in order to axially position said first 44 and/or second parts 46 of the stop along said stem 42. Said first and second parts 44, 46 have a central bore with a diameter substantially identical to that of the stem 42, so as to be able to be fitted thereon from a proximal end of said stem 42, opposite to the end bearing the head of the delivery valve 17. Said stem 42 forms a shoulder for the mounting ring 50 at the joint between the portion of reduced diameter 49 and said distal end. Said mounting ring 50 advantageously has a symmetric configuration so as to be able to be mounted either way round on the stem 42 of the delivery valve. Said mounting ring 50 and the first and second parts 44, 46 of the stop have in this case an axisymmetric configuration about the axis XX'.

Figure 8:
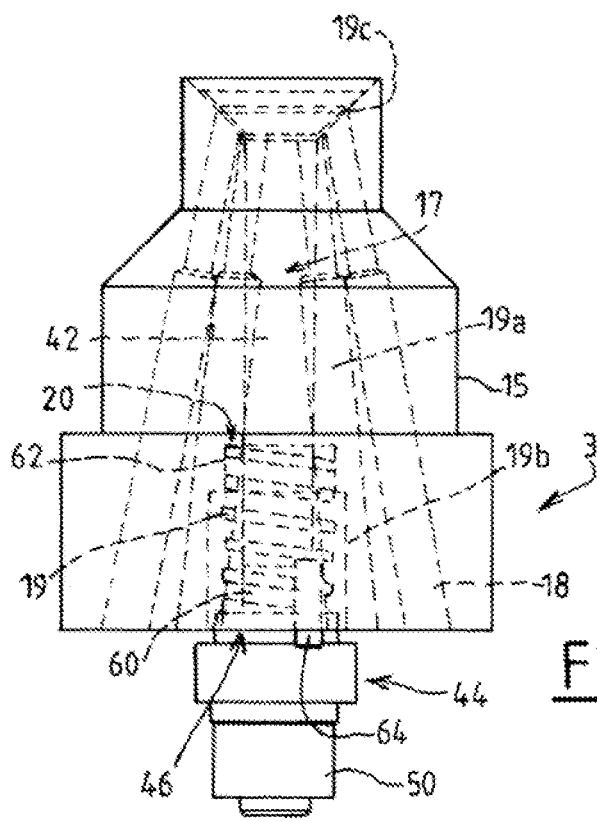
FIG. 8 is a side view illustrating a transparent view of an embodiment variant of a part of the device according to the invention.

As illustrated in FIG. 8, according to an embodiment variant illustrating another aspect of the invention, said device also comprises means for centering the spring 19 so as to keep said spring radially at a distance from the delivery valve 17. In other words, by virtue of said centering means, there is a sufficiently large radial clearance to avoid contact between the stem 42 of the delivery valve and the turns of the spring 19. In this way, abrasion of these parts by rubbing against one another is avoided.

Here, said centering means comprise a centering finger 60 for centering a first end of the spring 19. The turn(s) of the first end of the spring 19 are fitted over said centering finger 60. In other words, a diameter of said centering finger 60 and an inside diameter of the turns of the spring 19 correspond so as to allow the spring 19 to be fitted on the centering finger 60 with a very slight clearance.

Said centering finger 60 is mounted on said delivery valve 19, in particular on the stem 42 of the delivery valve. Said centering finger 60 and said stop 40, in particular the part 46 specific to each application of said stop 40, form a single part. Said centering finger has in this case an axisymmetric configuration about the axis XX'.

Said centering means in this case also comprise a guide tube 62 for guiding a second end of the spring 19 opposite to the first end. The turn(s) of the second end of the spring 19 are fitted into said tube 62. In other words, a diameter of said tube 62 and an outside diameter of the turns of the spring 19 correspond so as to allow the spring 19 to be fitted in the tube 62 with a very slight clearance. Said guide tube 62 is formed in said body, for example, in a top part of the lower zone 19b.

FIG. 8 also shows a guide pin 64 for guiding said device. It makes it possible to position said feed head 9 on said body 7.

Figure 9:
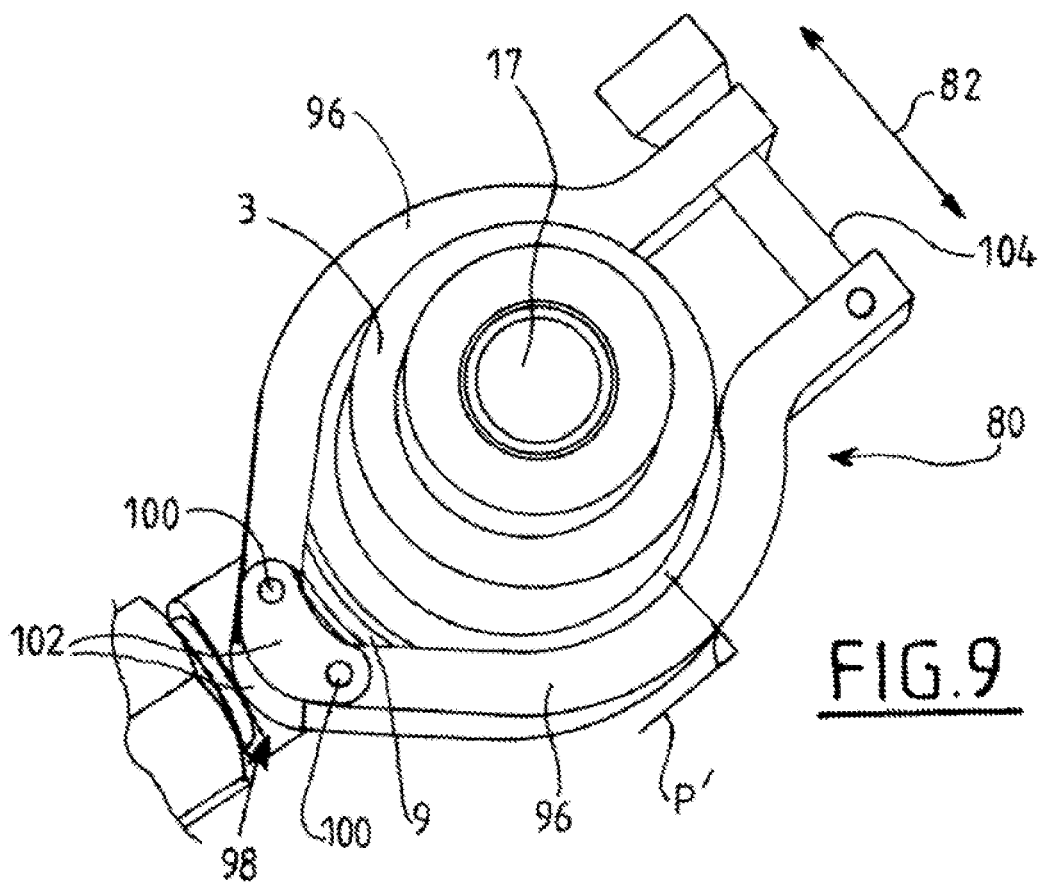
FIG. 9 is a perspective top view showing a variant assembly of a body and a head of a device according to the invention.
Figure 10:
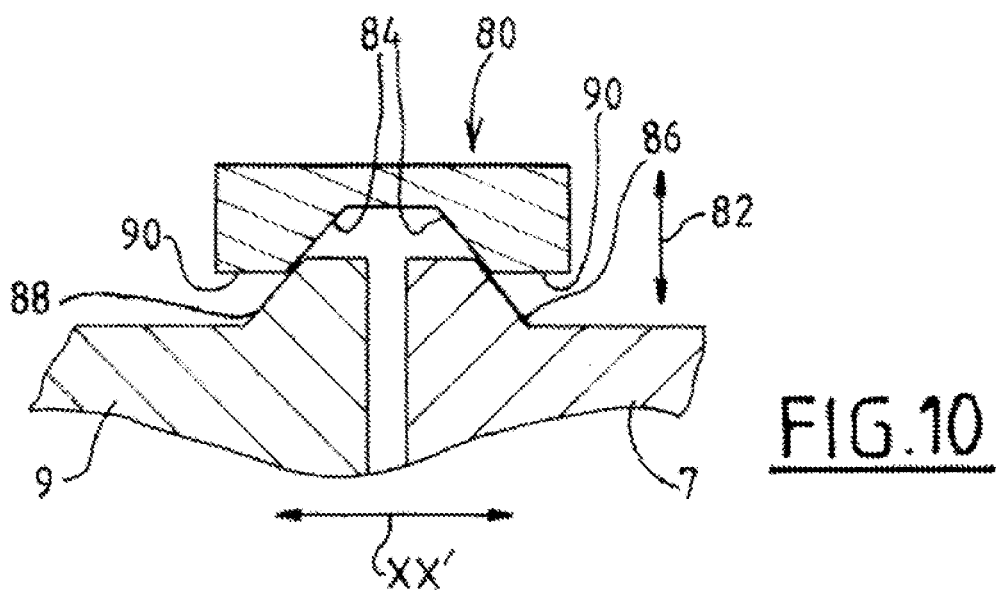
FIG. 10 is a schematic view illustrating a part of the device illustrated in FIG. 9, on the section plane P' indicated in that figure.

As illustrated in FIGS. 9 and 10, in an alternative way of fastening said feed head 9 on said body 7 and according to another aspect of the invention, said device comprises an assembly clamp 80 for assembling the body 7 and the dispensing head 9, said device being configured to convert a radial clamping movement of said clamp 80, with respect to a longitudinal axis of extension XX' of said device, this clamping movement being illustrated here by the arrow 82 in FIG. 10, into a movement clamping the head 9 and the body 7 together along said longitudinal axis of extension XX'.

For this purpose, in this case, said clamp 80 and said body 7 and/or said head 9 have an inclined surface 84, 86, 88 with respect to said longitudinal axis, said inclined surfaces being intended to cooperate with one another during the clamping of the clamp 80. This creates contact of the cone-against-cone type, by virtue of which the radial clamping of the clamp 80 makes it possible to move the head 9 toward the body 7.

The clamp 80 also comprises one or more stops 90 situated at a distal end of the inclined surface 84 of said clamp. Said stop(s) 90 of the clamp are defined by a distal annular surface of said clamp 80. Advantageously, the configuration of the inclined surfaces 84, 86, 88 makes it possible to improve the leaktightness of the device by ensuring that the head 9 is clamped against the body 7 before the clamp comes into radial abutment against the body 7 and/or the head. In other words, the stop(s) 90 of the clamp are configured to remain at a distance from one or from said parts, in this case provided in a cylindrical manner, of the body 7 and/or of the head 9, said parts being situated in the vicinity of the inclined surfaces 86, 88 of said body 7 and/or of said head 9, respectively, after clamping.

Referring to FIG. 9, it can be seen that said clamp 80 has, for example, a clip-like configuration. It comprises two arms 96, approximately in the shape of a C, that are articulated with respect to one another. Said arms 96 radially clamp said body 7 and said head 9 in the joining zone thereof.

Said arms 96 are articulated, for example, at a pivot 98. Said pivot 98 in this case comprises a hinge pin 100 for each arm 96. Said hinge pins 100 are connected by support plates 102. They are situated at one end of said arms 96. At the diametrically opposite end of said arms 96, a screw 104 of said device makes it possible to move the arms 96 toward one another in said radial clamping direction 82 of the clamp 80.

In addition or alternatively, in order to improve the leaktightness of the device according to the invention, said device comprises a peripheral seal (not illustrated) between said feed head 9 and said body 7. Referring again to FIG. 6, it can be seen that said feed head 9 comprises in this respect, in this embodiment, a peripheral housing 110 for said peripheral seal. Said peripheral seal is situated in this case beyond the seal closing the groove 22, said seal closing the groove 22 not being illustrated in this figure but being intended to bear, at its external periphery, on a bearing surface 112 of the face 23 at which said groove 22 opens out.

Said peripheral housing 110 is in this case situated between an internal peripheral slot 114 and an external peripheral slot 116 of said feed head 7. Said internal peripheral slot 114 externally delimits the housing for the seal closing the groove 22. Said internal peripheral slot 114 and external peripheral slot 116 are concentric.

Said feed head 9 also has a well 70 for the movement of the delivery valve 17. Said well 70 and said groove 22 are positioned concentrically. The well 70 is in line with the opening 19b in the body 7, the stop 40 being movable in the volume formed by said well 70 and the opening 19b during the actuation of the delivery valve 17.

Advantageously, the different constituent elements of the device are made of steel, preferably stainless steel.

In operation, the valve 6 is opened, and the cryogenic fluid is passed through the pipes 5 and then the hose 4 into the device 3, through the head 9, passing through the duct 24 and the groove 22, and then it passes into each of the channels 18 of the body 7. The pressurized fluid then exerts a pressure on the seat of the delivery valve, a space then being formed between the part 19c and the seat of the delivery valve. The solid starts to form in this space under the effects of pressure and temperature and is forced into the chamber. When it is necessary to stop the feed of cryogenic fluid, the valve 6 is closed.

The risks of liquids entering the structure of the nozzle when the nozzle is stopped were indicated above. Specifically, it may be considered that, when the nozzle is in operation, the products treated are not liquid (for example ground meat), the products are cooled and thus viscous, and furthermore, on account of the presence of the cryogenic fluid, there is an overpressure inside the nozzle, and so the products are pushed back.

By contrast, when stopped, there is a risk, depending on the products treated, of liquids passing into the nozzle.

This may be the case, as mentioned, between the base and the body of the nozzle, that is to say between the external part 14 and the internal part 15; it can also be the case in the channels 18 and the cylindrical intermediate space surrounding the stem 42 of the delivery valve.

Therefore, an advantageous implementation of the invention proposes flushing the nozzle when the latter is stopped with the aid of compressed air (or any other flushing gas suitable for this industry), for example with the aid of the installation 120 shown in FIG. 1.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for injecting a cryogenic fluid, the device comprising
   a fluid feed head;
   a fluid dispensing body mounted in a detachable manner on said feed head, said feed head comprising a fluid flow groove, feeding said body, said groove being closed in a mounted position of the body on the feed head and said groove being open in a separated position of said feed head and said body;
   a seal configured to close said groove;
   a delivery valve that is forced against said body by a spring; and
   a stop, mounted on a stem of the delivery valve, said spring bearing against said stop, said spring comprising a plurality of turns, said stop and said spring being configured such that the stop comes into contact with the body before the turns of the spring are brought into contact with one another during actuation of the delivery valve, wherein said stop comprises a first part, intended to be constant, and a second part, intended to be specific to each application, wherein said stem comprises a portion of reduced diameter and said stop comprises a mounting ring, said stem and said mounting ring being mutually configured so as to allow said ring to be snap-fastened on said stem at said portion of reduced diameter in order to axially position said first and/or second parts of the stop along said stem.

2. The device of claim 1, wherein said body has one or more fluid flow channels that together define a flow cross section for the fluid in the body, said groove having a flow cross section for the fluid that is greater than the flow cross section for the fluid in the body.

3. The device of claim 2, wherein there are at least three of said channels.

4. The device of claim 1, wherein said groove has a substantially constant depth.

5. The device of claim 1, wherein said groove has a U-shaped cross section.

6. The device of claim 1, wherein said groove is annular.

7. The device of claim 1, wherein a first part of said groove has a reduced depth and a second part has a greater depth.

8. The device of claim 1, wherein said feed head comprises a fluid flow duct, said duct opening out at a side wall of the groove.

9. The device of claim 1, wherein said head has a face at which said groove opens out in the separated position of the feed head and the body, said head extending in a longitudinal direction orthogonal to said face.

10. The device of claim 9, wherein said groove has a depth greater than three quarters of an extension of said feed head in said longitudinal direction.

11. The device of claim 1, wherein said seal has orifices that open into said body.

12. The device of claim 1, wherein said device comprises means for centering the spring so as to keep said spring radially at a distance from the delivery valve.

13. The device of claim 12, wherein said centering means comprise a centering finger for centering a first end of the spring, said centering finger being mounted on said delivery valve.

14. The device of claim 13, wherein said centering means comprise a guide tube for guiding a second end of the spring, said guide tube being formed in said body.

15. The device of claim 1, wherein said device comprises an assembly clamp for assembling the body and the dispensing head, said device being configured to convert a transverse clamping movement of said clamp, with respect to a longitudinal axis of extension of said device, into a movement clamping the head and the body together along said longitudinal axis of extension.

16. The device of claim 15, wherein said clamp and said head and/or said body have an inclined surface with respect to said longitudinal axis, said inclined surfaces being intended to cooperate with one another during the clamping of the clamp.

17. A cooling installation for cooling food products, comprising a container for containing a product to be cooled in a loose form, and comprising at least one injection device being intended to be fastened to a lower part of the container, wherein the at least one injection device is as claimed in claim 1.

18. The cooling installation of claim 17, further comprising an installation for feeding a flushing gas to the at least one injection devices, allowing the flushing gas to be fed to the at least one injection devices when the cooling installation is stopped.

19. The cooling installation of claim 18, wherein the installation for feeding the flushing gas to the at least one injection devices comprises one or more feed lines for feeding the flushing gas to the at least one injection devices, the one or more feed lines being provided with a non-return valve.

* * * * *